(12) United States Patent
Witt

(10) Patent No.: US 8,023,728 B2
(45) Date of Patent: Sep. 20, 2011

(54) DISPLAY APPARATUS AND METHOD

(75) Inventor: Sarah Elizabeth Witt, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 983 days.

(21) Appl. No.: 11/875,522

(22) Filed: Oct. 19, 2007

(65) Prior Publication Data

US 2008/0137966 A1    Jun. 12, 2008

(30) Foreign Application Priority Data

Dec. 6, 2006  (GB) .................................. 0624407.3

(51) Int. Cl.
G06K 9/00 (2006.01)
G06K 9/34 (2006.01)
G06K 9/46 (2006.01)
G06K 9/66 (2006.01)
G09G 5/00 (2006.01)

(52) U.S. Cl. ........ 382/162; 382/164; 382/171; 382/173; 382/180; 382/190; 345/581

(58) Field of Classification Search .................. 382/162, 382/164, 171, 173, 180, 190; 345/581
See application file for complete search history.

(56) References Cited

U.S. PATENT DOCUMENTS

| 5,999,664 A * | 12/1999 | Mahoney et al. ............ 382/305 |
| 2006/0193536 A1 * | 8/2006 | Pilu .............................. 382/298 |
| 2006/0239548 A1 | 10/2006 | Gallafent et al. |
| 2007/0147708 A1 * | 6/2007 | Lee .............................. 382/298 |

FOREIGN PATENT DOCUMENTS

GB    2 313 012 A    11/1997

* cited by examiner

*Primary Examiner* — Bhavesh Mehta
*Assistant Examiner* — Bernard Krasnic
(74) *Attorney, Agent, or Firm* — Oblon, Spivak, McClelland, Maier & Neustadt, L.L.P.

(57) ABSTRACT

In a method of displaying an image from an image store to a display device, each pixel has a color represented by pixel values which define a position within color space. A plurality of regions are defined within the color space, and each pixel value used within the image is allocated to one of these regions within the color space. Then, one or more areas of the image are selected, and for each of the selected areas, one of the defined regions within the color space is selected. For each selected area of the image, pixels which have been allocated to the selected region within the color space are identified and added to the image store. Different areas of the image and regions of the color space are selected in succession until all pixels of the image have been added to the image store for display.

11 Claims, 7 Drawing Sheets

DISPLAY APPARATUS AND METHOD

RELATED APPLICATIONS

The present application claims priority from UK Application No. GB 0624407.3, filed Dec. 6, 2006, and entitled "Displaying an Image by Selecting Different Areas of the Image and Regions of Colour Space for Successive Display," the disclosure of which is hereby incorporated by reference herein in its entirety.

BACKGROUND OF THE INVENTION

1. Field of the Invention

The present invention relates to a display apparatus and a display method. Embodiments of the invention relate to displaying an image in accordance with a special effect.

2. Description of the Prior Art

A variety of special effects which can be applied to still pictures exist. These may involve distorting the spatial characteristics or an image, or adapting the colours within an image to produce a desired visual effect. These effects can be applied as a function of time, thereby making the display of a still image appear as a time dependent sequence of images. In addition, effects can be applied to gradually introduce an image on a display apparatus by increasing the luminance of the pixels of the image from zero to a final value as a function of time.

SUMMARY OF THE INVENTION

According to one aspect of the present invention, there is provided a method of displaying an image from an image store to a display device at a predetermined output frame period in which the image is represented by a plurality of pixels and each pixel has a colour represented by pixel values which define a position within colour space. In the display method, a plurality of regions are defined within colour space, and then each pixel value used within the image is allocated to one of the defined regions within colour space in accordance with the position in colour space of the pixel value. Then, one or more areas of the image are selected, and for each of the selected one or more areas, one of the defined regions within colour space is selected. For each selected area of the image, pixels which have a pixel value which has been allocated to the selected region within colour space are identified and add to the image store. Different areas of the image and regions of colour space are selected in succession in accordance with a predetermined sequence in time until each combination of image area and region of colour space has been selected and all pixels of the image thereby added to the image store for display. The predetermined sequence in time has a duration which is longer than the predetermined output frame period.

In this way, by progressively building up an image in units of area and colour, it is possible to provide a visual effect of the image being "painted in" by hand. This is achieved by providing a image store which is progressively populated with pixels from the original image, and in particular by providing that the image store is updated with new pixels each frame (or at least at some frames), and that the entire contents of the image store, including the newly added pixels is displayed at each frame. The selection of pixels to update the image store is achieved by the process of selecting combinations of image areas and regions of colour space in sequence, and storing to the image store only those pixels which fall within the selected image areas and colour space regions. In this way, the image can be gradually built up in the image store over a number of frames, due to the selection sequence having a longer duration than a frame period at which the contents of the image store is transferred to, and displayed on, the display device.

While the regions of colour space could be defined arbitrarily, for instance by dividing colour space into evenly sized volumes, colour space regions could also be defined taking into account the characteristics of the image. In this case, the image is first analysed to determine the distribution of pixels within colour space, and then the plurality of regions within colour space are defined in accordance with the determined distribution of pixels. For example, the regions within colour space may be defined such that the number of pixels of the image present within each determined region of colour space is approximately equal. In this way, the application of each image region will have an appreciable visual effect on the display of the image.

The selected areas of the image may each define a mask to be applied to the image. The mask may have a peripheral area which is defined such that only a portion of the pixels falling within the peripheral area and having a colour value allocated to the selected colour space region, will be added to the image store for display. In this way, a softer visual effect is provided when painting in pixels corresponding to a particular colour space region.

While any sequence of image areas and colour space regions could be used, and may give rise to a useful visual effect, the predetermined sequence with which the areas of the image and regions of colour space are selected may be defined such that the display of areas of the image corresponding to each colour region will gradually progress across the image, with the progress of areas corresponding to different colour regions being offset by a predetermined number of frames.

According to another aspect of the present invention, there is provided a display apparatus for displaying an image from a image store to a display device at a predetermined output frame period. The image is represented by a plurality of pixels, each of which has a colour represented by pixel values which define a position within colour space. The apparatus comprises a colour space processor, a selection processor and a display processor. The colour space processor defines a plurality of regions within colour space, and allocates each pixel value used within the image to one of the defined regions within colour space in accordance with the position in colour space of the pixel value. The selection processor selects one or more areas of the image, and then selects, for each of the selected one or more areas, one of the defined regions within colour space. The display processor identifies, for each selected area of the image, pixels which have a pixel value which has been allocated to the selected region within colour space, and adds the identified pixels to the image store. Different areas of the image and regions of colour space are selected by the selection processor in succession in accordance with a predetermined sequence in time until each combination of image area and region of colour space has been selected and all pixels of the image thereby stored to the image store for display. The predetermined sequence in time has a duration which is longer than the predetermined output frame period.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
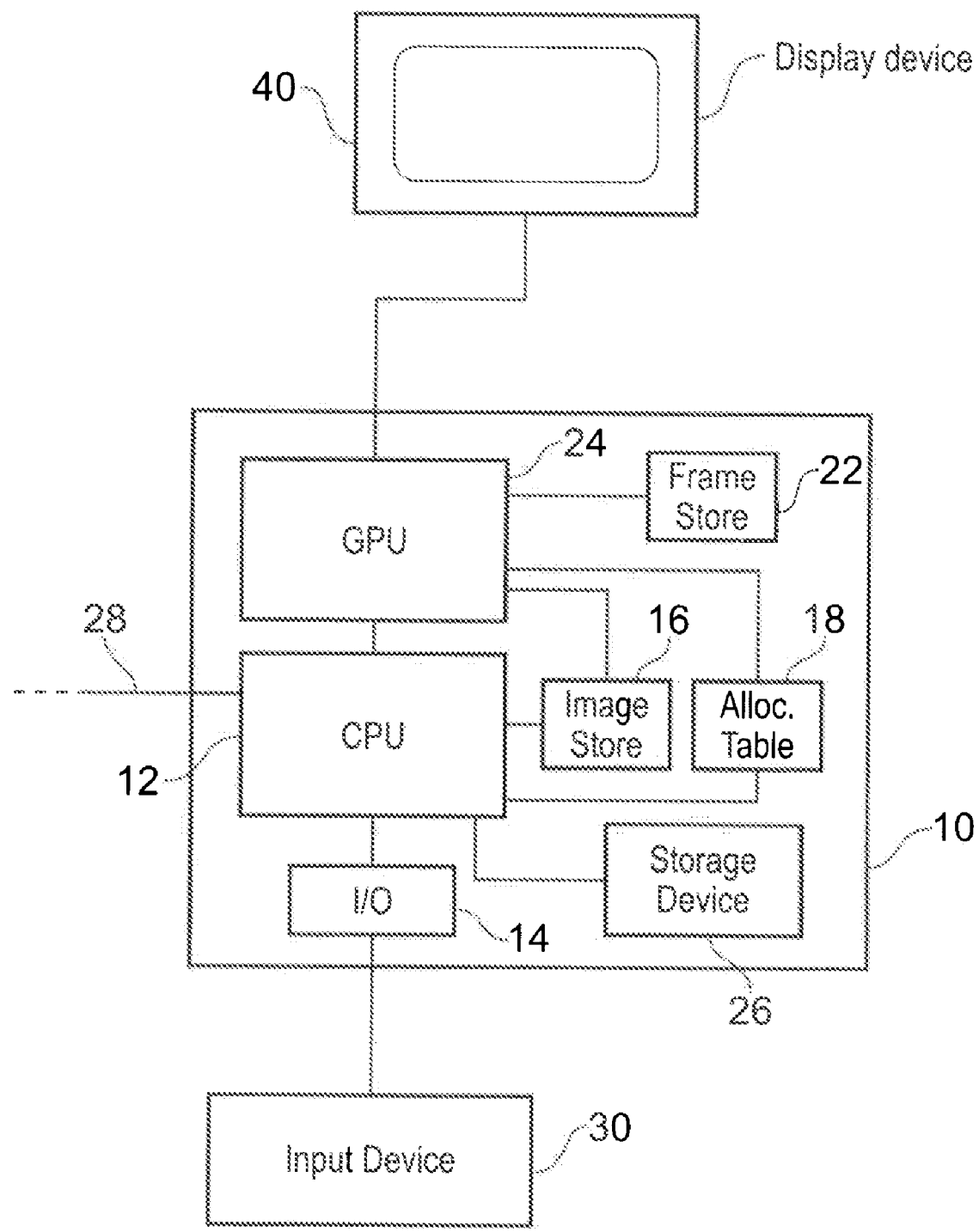
FIG. 1 schematically illustrates a display apparatus according to an embodiment of the present invention.

Referring to FIG. 1, a data processing unit 10, such as a personal computer or game machine, is operable to display images on a display device 40 connected to the data processing unit 10. The data processing unit 10 is connected to an input device 30 via an input/output interface 14. The input device 30 can be used by a user to control the operation of the data processing unit 10. The data processing unit 10 is also provided with a network connection 28 which enables data to be received from and transmitted to an external network.

The data processing unit 10 includes a central processing unit (CPU) 12, a graphics processing unit (GPU) 24, a storage device 26, a frame (image) store 22 for storing an image in the form in which it is to be displayed on the display device 40, an image store 16 for storing an original image, and an allocation table 18 for storing a correspondence between pixel colour values and regions of colour space. An image which is to be displayed to the display device 40 is updated in the frame store 22, and transmitted from the frame store 22 to the display device 40, each predetermined frame period. The image store 16 and the allocation table 18 are accessible by both the CPU 12 and the GPU 24. The storage device 26 may store a computer program for controlling the operation of the data processing unit 10. The computer program may be supplied to the data processing unit 10 for storage on the storage device 26 via a computer-readable storage medium, or alternatively via the network connection 28. Alternatively, the display method described below may be controlled by a hard-wired function of the data processing unit 10.

Figure 2:
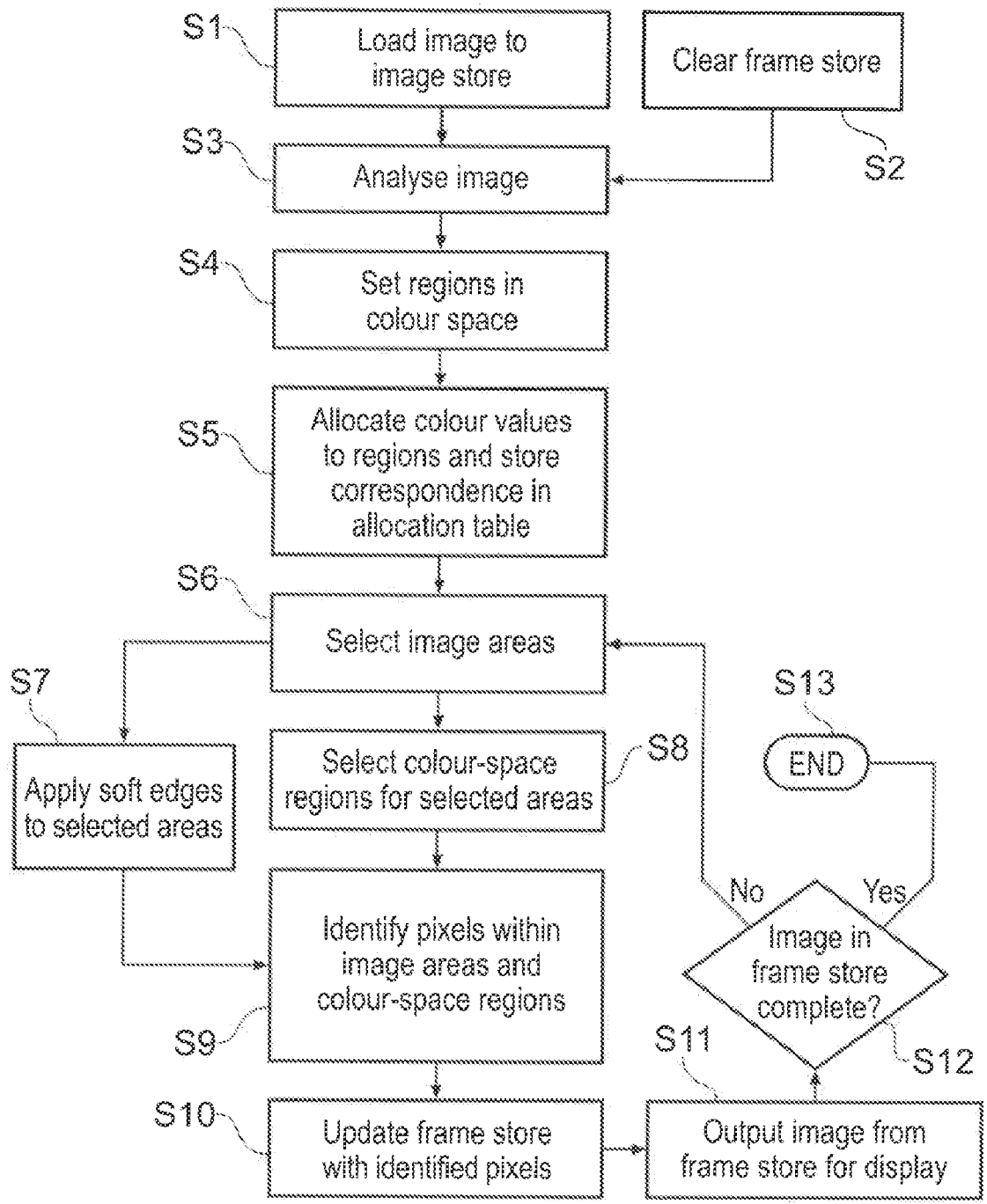
FIG. 2 is a schematic flow diagram illustrating a display method according to an embodiment of the present invention.

The operation of the data processing unit 10 of FIG. 1 will now be described with reference to the flow diagram of FIG. 2, which schematically illustrates the steps involved in displaying an image according to an embodiment of the invention.

First, at a step S1, an image to be displayed is loaded into the image store 16 by the CPU 12. The selection of the image for display could be determined automatically by an application running on the data processing unit 10 or selected by a user via the input device 30. The image stored to the image store 16 is a still picture defined by a plurality of pixels, each pixel having a colour represented by colour values which define a position within colour space. For instance, each pixel may be represented by three values, these being a red (R) value, a green (G) value and a blue (B) value respectively. These three values, which each define an axis, together define a three-dimensional RGB colour space. In a 24-bit RGB colour space, 16,777,216 positions, or colours, will exist, corresponding to 256 possible values (8 bits) for each of the red, green and blue axes. Other colour models and colour spaces may be used instead, such as hue, saturation and value (HSV).

Figure 3:
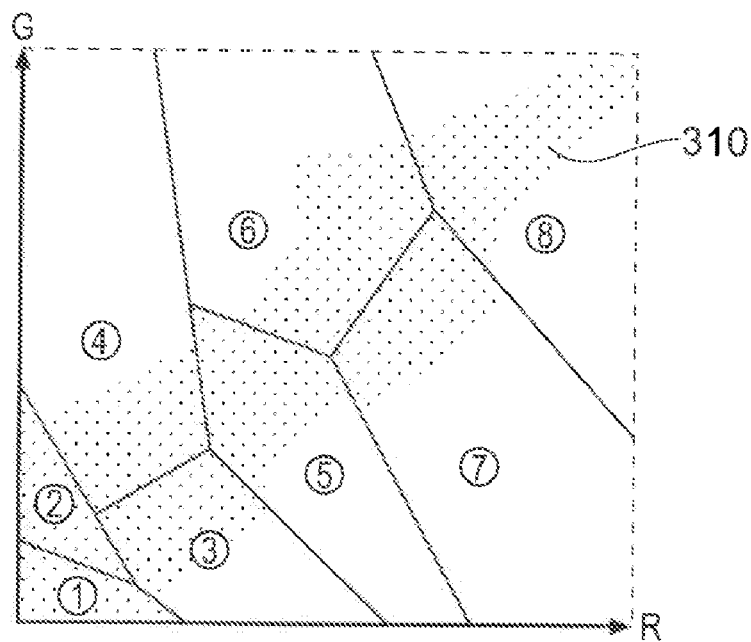
FIG. 3 schematically illustrates the division of a two-dimensional colour space into a plurality of regions.

At a step S2, the frame store 22 is cleared, to remove any picture data present from a previous display operation. As an alternative, the contents of the frame store 22 could simply be overwritten. At a step S3, the image in the image store 16 is analysed by the CPU 12, serving as a colour space processor, to determine the distribution of the pixels of the image within colour space, and in particular to determine the position of each pixel within colour space. Then, at a step S4, the CPU 12 defines a plurality of regions in colour space, taking into account the distribution of pixels determined in the step S3. Referring to FIG. 3, a two-dimensional representation of a red-green colour space is shown, with the third dimension of blue being omitted here for the sake of clarity. FIG. 3 illustrates a distribution of pixels 310 within the two-dimensional colour space, and the division of the colour space into eight regions labelled 1 to 8 in a manner which seeks to result in the same number of pixels being allocated to each region. It will be appreciated that the same principles can be applied to the division of three-dimensional colour space. The regions in colour space can be determined from the pixel distribution of the image in a number of ways. For instance, the regions could be determined using similar methods to those used when quantizing an image to reduce its colour depth. One example of a quantization algorithm which could be used in this way is the median cut algorithm, which operates in accordance with the following steps:

(1) Determine the smallest box within colour space which contains all colours used within the image;

(2) Sort the enclosed colours along the longest axis of the box;

(3) Split the box into two regions at the median of the sorted list; and (4) Repeat steps (2) and (3) until the original colour space has been divided into the desired number of regions.

Alternatively, the plurality of regions in colour space could be defined without taking into account the characteristics of the image to be displayed, which would simplify processing but which may result in an inferior visual effect. In this case, if the characteristics of the image are not to be taken into account, then the step S3 is not required, and the step S4 could be carried out simply by quantizing each of the RGB components, for instance to convert each 8 bit axis into a 3 value axis, thereby dividing each axis into three equally sized portions. This would result in colour space being divided into 27 cubes, with each cube representing a region in colour space. Of course it will be appreciated that the colour space could be divided up using a different level of quantization, or by another method entirely.

Once the regions within colour space have been defined at the step S4, each colour value used within the image to be displayed is allocated to one of these regions at a step S5. In particular, a colour value will be allocated to a given colour space region in dependence on whether the position in colour space of the colour value falls within the colour space region. The correspondence between colour values and colour regions is then stored to an allocation table 18 of the data processing unit 10.

At a step S6, the CPU 12, serving as a selection processor, selects one or more image areas for a display operation. The selected image areas are passed by the CPU 12 to the GPU 24 to be processed for display. The image areas selected by the CPU 12 could be rectangles or squares of the image. At the GPU 24, at a step S7, the areas selected by the CPU may be converted to a different shape, for instance a circle or ellipse, and the edges of the area may be softened by applying a noise function. The implications of the soft edge applied to the image area will be described later with reference to FIG. 4.

At the CPU 12, at a step S8, a particular region of colour space is selected for each of the image areas selected at the step S6. In this way, multiple areas of the image can be processed simultaneously for respective different regions of colour space. This gives the effect of multiple colours being painted at the same time at different parts of the image. The selected regions of colour space are passed by the CPU 12 to the GPU 24. The GPU 24, acting as a display processor, then applies the selected areas with their corresponding colour regions to the image stored in the image store 16 as a mask at a step S9, and for each selected area identifies pixels of the image which are within that selected image area and which have a colour value associated with the colour region corresponding to that selected image area by referring to the allocation table 18. Then, at a step S10, the frame store 22 is updated by the GPU 24 with the identified pixels, and the updated contents of the frame store 22 is then displayed, at a step S11, on the display device.

When the frame store has been updated and the updated image in the frame store displayed, the GPU 24 determines whether the image in the frame store 22 is complete at a step S12. If the image in the frame store 22 is determined to be complete, then the entire image is deemed to have been displayed, and processing will end at a step S13. Alternatively, if the image in the frame store 22 is determined not to be complete, then processing returns to the step S6, where the sequence of selecting image areas and colour regions for display will be repeated. One way in which the GPU 24 can determine that the image in the frame store 22 is complete is by comparing the image in the frame store 22 with the image in the image store 16. If the two images are identical, then the complete image has been stored in the frame store 22 and displayed. If there are any discrepancies between the two images, this will indicate that pixels of the original image have yet to be updated in the frame store 22.

While the embodiment of the invention described with reference to FIG. 1 and FIG. 2 uses an allocation table to store a correspondence between pixel values within the image and regions of colour space, in an alternative embodiment, the allocation table is dispensed with, and the determination of whether pixel values fall within a particular colour space region is conducted as part of the identification process described with reference to the step S9 of FIG. 2. Specifically, when identifying at the step S9 whether the colour value of a pixel falls within a particular region in colour space, this is achieved by comparing the location of the pixel value within colour space to the boundaries of the current region, rather than by reference to an allocation table. An example of how this can be done is to define spherical regions in colour space, and to detect whether a pixel lies in that region by detecting whether its position in colour space lies within a threshold Euclidean distance of the centre of the spherical region. In this case, the step S5, in which the allocation table is formed, is omitted.

Figure 4:
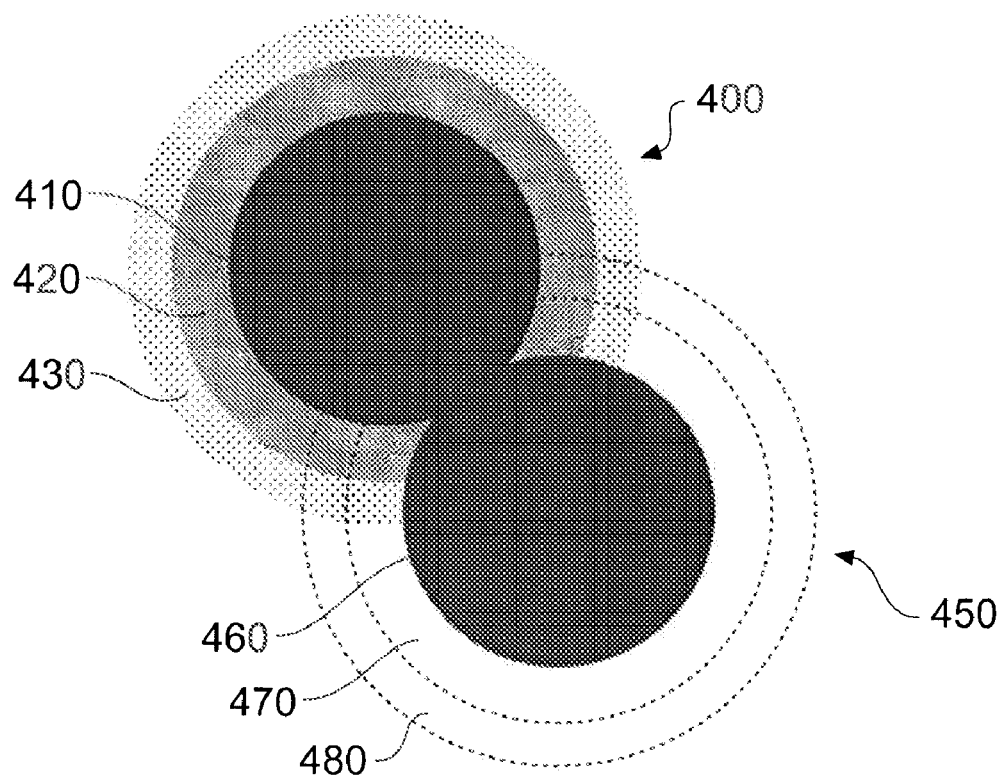
FIG. 4 schematically illustrates an example image area mask having soft edges.

Referring to FIG. 4, two example image regions 400 and 450 are schematically illustrated, each of which has "soft" edges. Referring first to the image region 400, a central part 410 of the image area 400 is "hard", in that all pixels falling within the central part 410 and having an appropriate pixel value will be added to the frame store 22 for display. However, the inner ring 420 and the outer ring 430 of the image area 400 are "soft", in that not all pixels falling within these parts of the image area 400 and having an appropriate pixel value will be displayed (alternative effects of the soft areas can also be envisaged, such as displaying pixel values in these areas with a reduced level of intensity). In this example, two soft areas are used, these being the inner ring 420, and the outer ring 430, which is softer than the inner ring 420 such that pixels within the outer ring 430 having an appropriate pixel value are less likely to be displayed than pixels within the inner ring 420 having an appropriate pixel value. These soft parts of the image areas soften the effect of displaying the pixels of the image area 400. Referring now to the image region 450, it can be seen that the image region 450 shares the same structure as the image region 400, having a hard central part 460, and soft peripheral rings 470 and 480 (although the shading of the rings 470 and 480 has been omitted for clarity). The image areas 400 and 450 represent two different areas of the image which will be stored to the frame store 22 for display at different times in respect of the same colour space region. In order that all pixels of the image are eventually displayed, the sequence of image areas must be defined such that the hard parts of different image areas in respect of the same colour space region either abut or overlap each other, as can be seen in FIG. 4. The soft edges can be applied in a number of ways, such as by applying a statistical filter to pixels in these portions of the image areas when updating the frame store 22 with the identified pixels, or by excluding certain pixels from the edges of the selected image area for the purpose of identifying pixels within the selected area and colour region.

It will of course be appreciated that it is not necessary to apply soft edges around the entire periphery of the image area. It is only necessary that the leading edge of the image area, that is, the edge of the image area which is being applied to an area of the image which has not previously been displayed using a current colour space region. The opposed (trailing) edge of the image area will of course be applied to an area which was displayed in a previous frame, due to the necessary overlap between adjacent image areas to allow for the soft edges, and so a soft edge would provide no visual benefit.

Figure 5A:
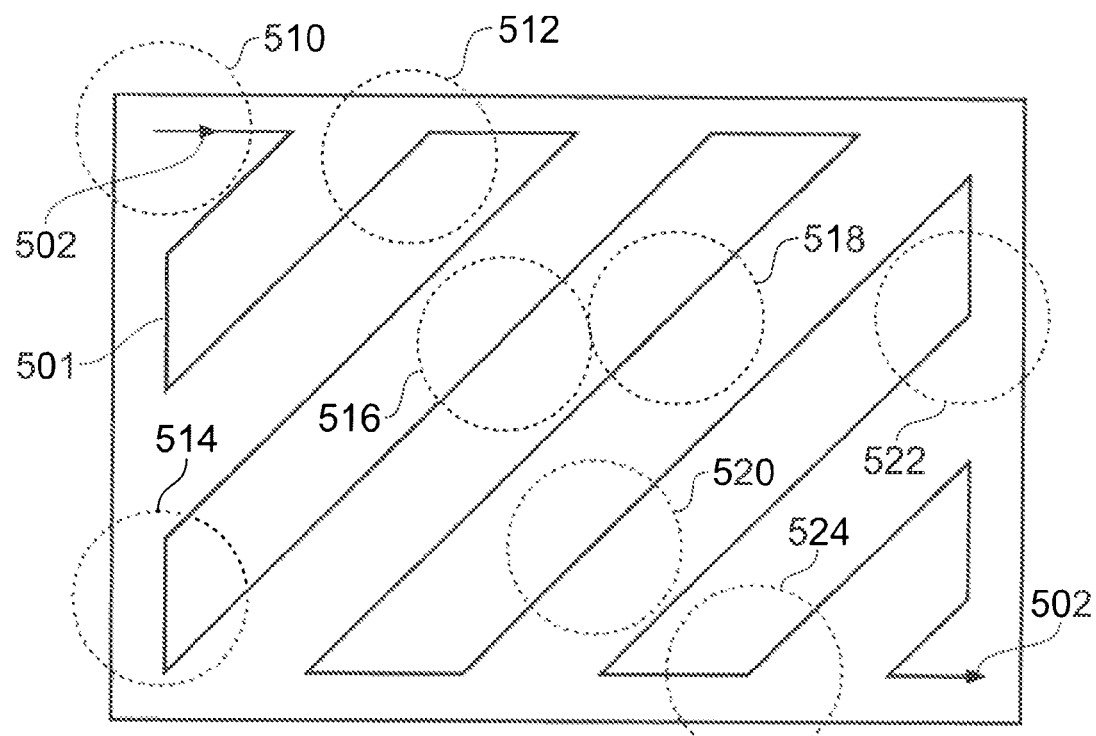
FIGS. 5A and 5B schematically illustrate example display paths defined across an image in accordance with embodiments of the present invention.

Referring to FIG. 5A, a first example sequence of image areas and regions of colour space is schematically illustrated. A line 501 illustrates a path taken by successive image areas for each region of colour space in the direction of arrows 502. It will therefore be appreciated that successive image areas are selected so that pixels corresponding to a particular region of colour space are displayed progressing along a path centred on the line 501. Image areas 510, 512, 514, 516, 518, 520, 522 and 524 are shown, each being centred on the line 501 and being offset from each other along the line 501. The image areas 510, 512, 514, 516, 518, 520, 522 and 524 represent those image areas which have been currently selected for display, and each of these image areas is associated with a different region of colour space. In this way, with the embodiment of FIG. 5A, all regions of colour space may be applied in the same frame period, but at different parts of the image. In the next frame period, each of the image areas 510, 512, 514, 516, 518, 520, 522 and 524 will be shifted along the line 501 by a predetermined amount to draw in pixels of a new portion of the image. The diagonal-based pattern of the line 501 in FIG. 5A gives the impression of the image being painted in diagonally from the top left corner of the image to the bottom right corner of the image.

In another similar arrangement (not shown), a centre position can be defined outside of the image boundary, and the image areas sweep in an arcuate motion around that centre position, with a radius changing at each sweep, to define a scan of the whole image.

Figure 5B:
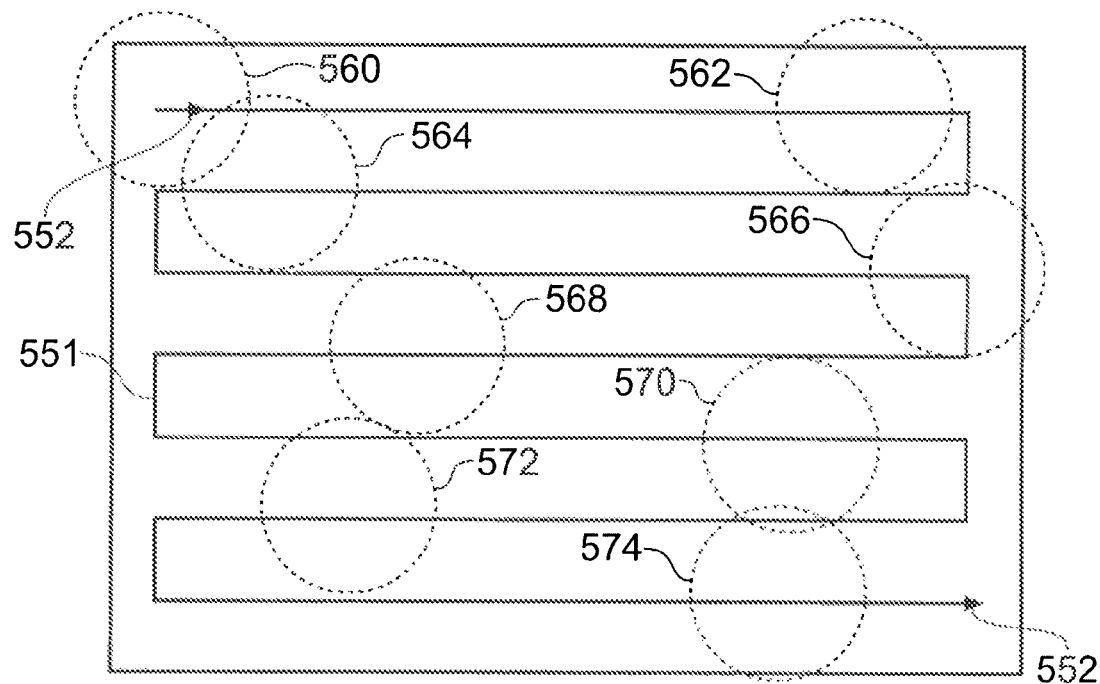

Referring to FIG. 5B, a second example sequence of image areas and regions of colour space is schematically illustrated.

A line 551 illustrates a path taken by successive image areas for each region of colour space in the direction of arrows 552. In this case, the path taken across the image progresses from the top of the image to the bottom of the image, resulting in a perceived effect of the image being painted in from top to bottom. Image areas 560, 562, 564, 566, 568, 570, 572 and 574 represent areas of the image which have been selected for display in the same output frame, and which correspond to different regions of colour space.

Alternatively, all areas of the image could be selected for display in sequence in respect of one of the colour space regions before moving on to the next colour space region. This would give the impression of the image being drawn in one colour at a time, but would either increase the duration required to display the complete image in all colours, or require each colour to be drawn in very quickly.

While FIGS. 5A and 5B illustrate an example order in which image areas may be selected, the order in which colour space regions are applied can be selected separately from this. In principle, the colour space regions can be applied in any order, provided that all colour space regions will have been used in respect of all image areas by the end of the predetermined sequence. In one example, colour space regions are applied to the image in an order of light intensity, resulting in a visual effect of darker areas of the image being painted in before lighter areas of the image. In another example, the colour space regions are applied in colour component order, such that for example pixels which are generally red are drawn in before pixels which are generally green, which are in turn drawn in before pixels which are generally blue.

Figure 6A:
FIGS. 6A to 6F are example images representing the display output provided at six different times during the display process.

Referring to FIGS. 6A to 6F, a series of output frames are shown at various positions within the predetermined display sequence. The sequence of image areas and colour space regions used to generate the images shown in FIGS. 6A to 6F is similar to the sequence shown in FIG. 5A. FIG. 6A shows an output frame at a relatively early stage of the predetermined sequence, at which time the first colour space region has only progressed across approximately half of the image, resulting in pixels being displayed in respect of only half of the image. The subsequently applied colour space regions, which are offset in time by a predetermined number of frames, are currently being applied to image areas closer to the top left corner of the image, or in the case of the last colour space regions in the predetermined sequence, have not yet been applied to the image at all.

Figure 6B:
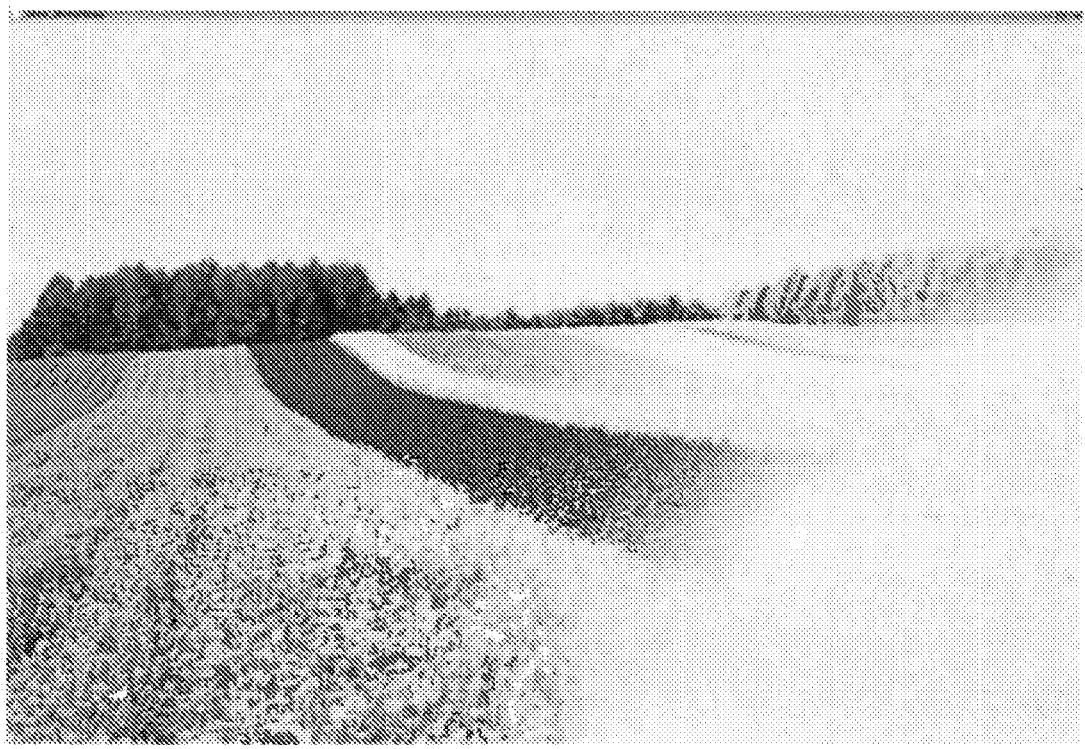

FIG. 6B shows an output frame several frames after FIG. 6A, at which time more of the image has been filled in by the first-applied colour space region, and areas of the image which were already visible in FIG. 6A have been filled out with further pixels due to the application of subsequent colour space regions.

Figure 6C:
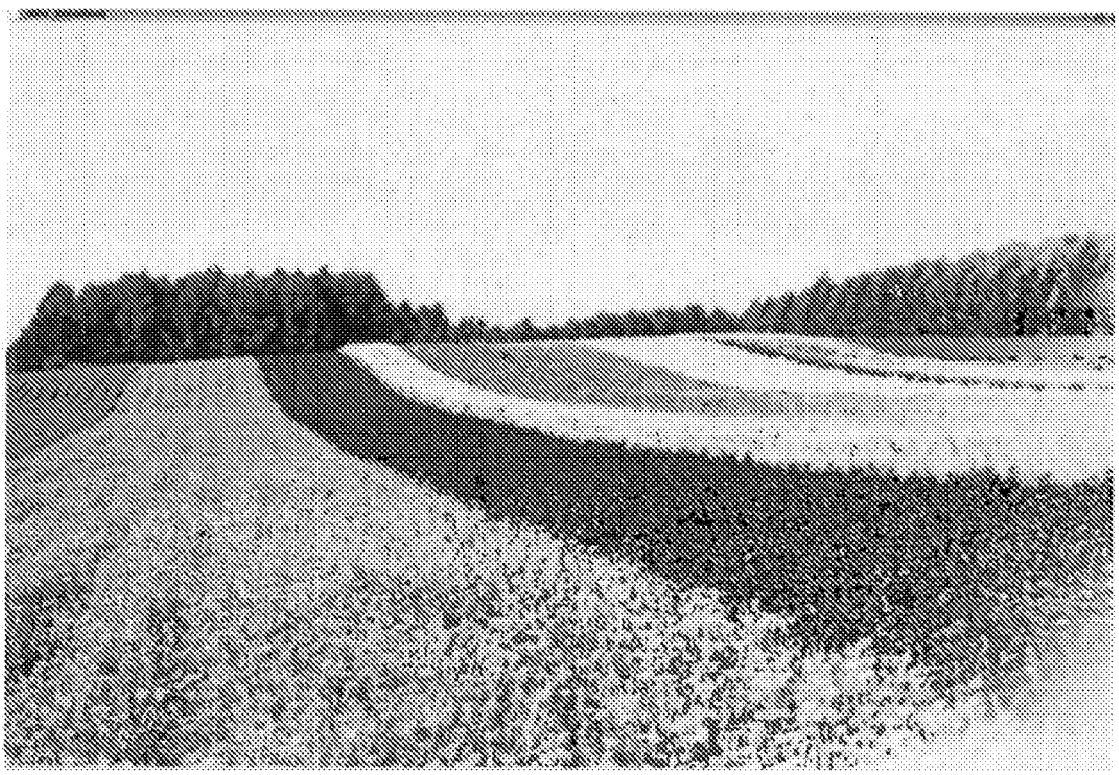

At FIG. 6C, the first-applied colour space region has now been applied across almost the entire image, resulting in only a very small empty area at the bottom right corner of the image. Previously visible areas of the image have again been filled out with further pixels due to the application of subsequent colour space regions.

Figure 6D:
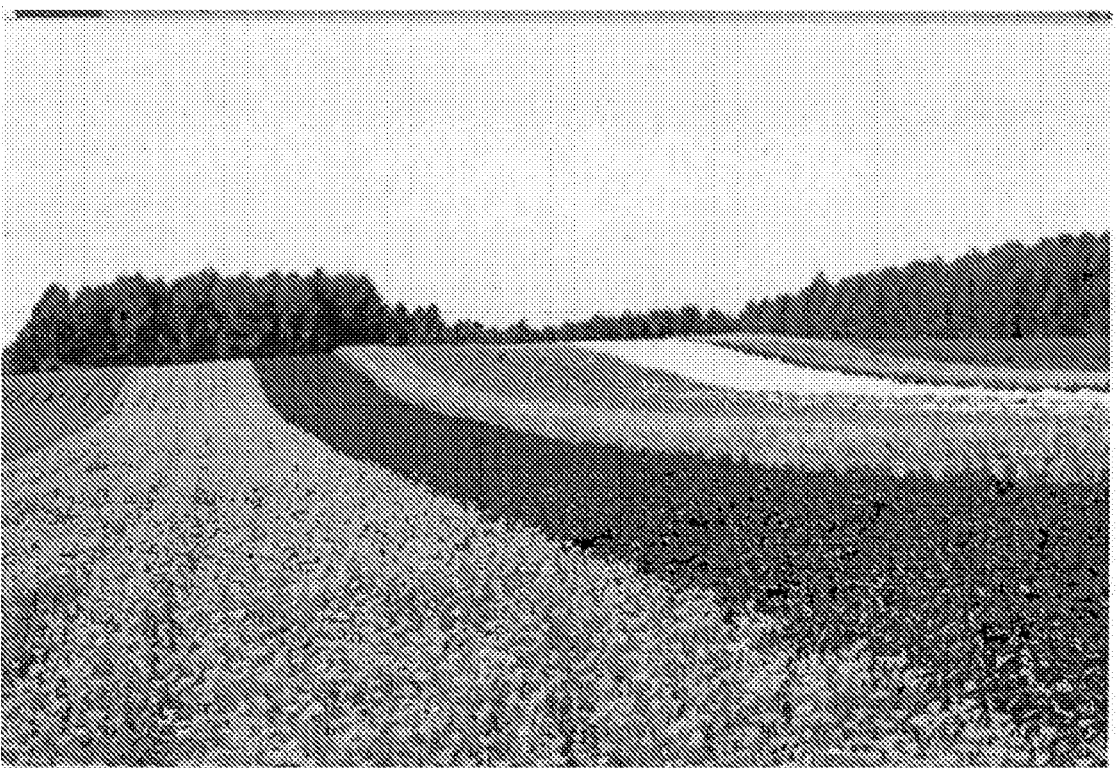

At FIG. 6D, at least the first-applied colour space region has been fully applied across the image, and much of the field area and tree line appears almost complete. However, the areas of sky at the top of the image have not yet been populated with pixels. This is because the colour space regions which correspond to the sky are blue regions, which in this embodiment are among the last colour space regions to be applied to the image.

Figure 6E:
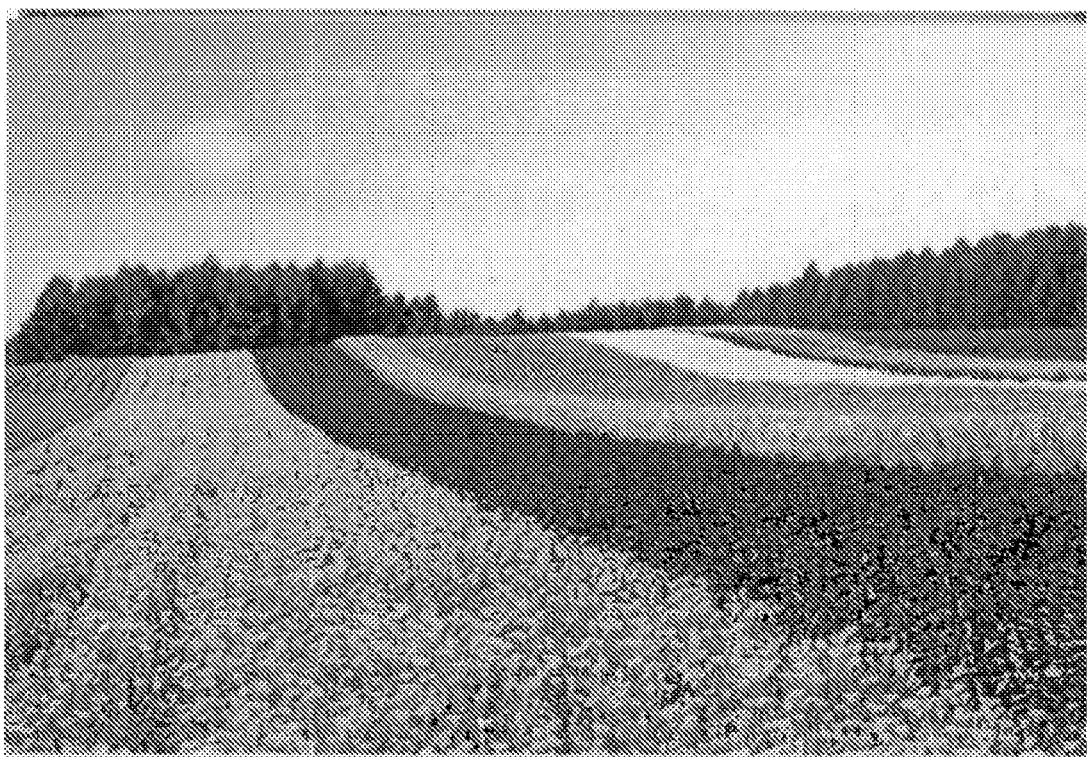

At FIG. 6E, the areas of sky have been partially drawn in, as the blue colour space regions have progressed across the image.

Figure 6F:
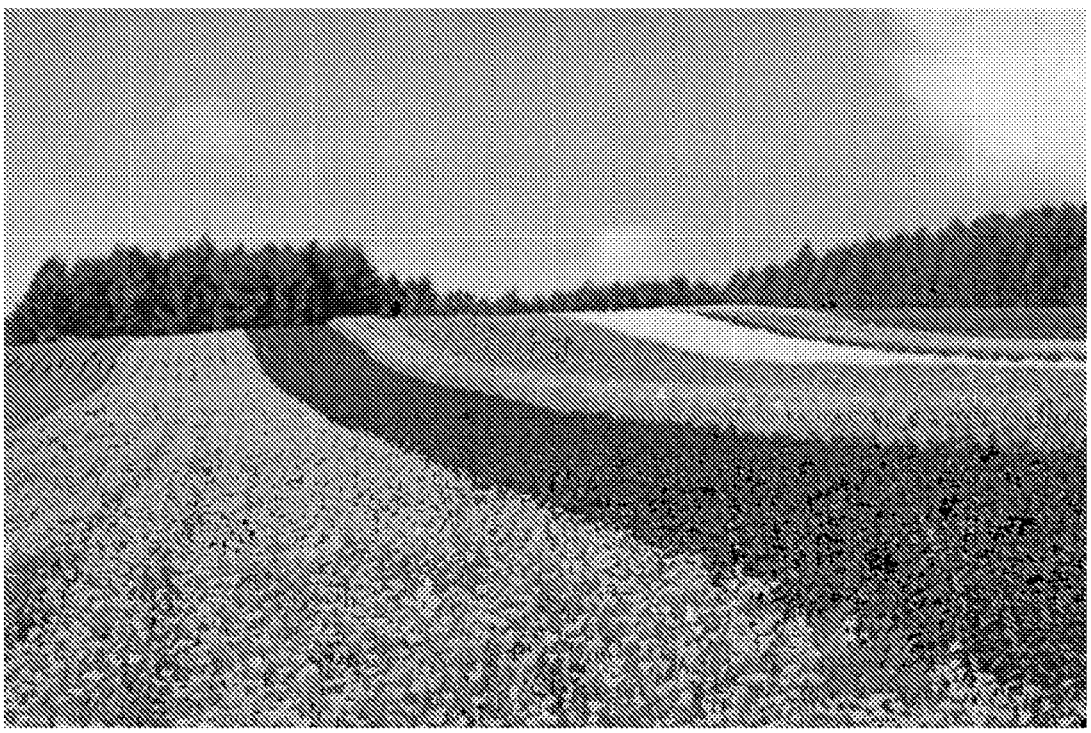

Finally, FIG. 6F illustrates the complete image, for which all colour space regions have been applied. The completed image, which like each of the images shown in FIGS. 6A to 6E is stored in the frame store for display, corresponds exactly to the original image stored in the image store.

The display of images on the display device is achieved by outputting the contents of a frame store to the display device once every predetermined output frame period. The display of a time-varying sequence of images generated as described above spans a number of such frame periods. In this way, the image is gradually built up in the frame store, and on the display device, over a number of output frames, due to the selection sequence having a longer duration than a frame period of the display device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of displaying a first image from a frame store to a display device at a predetermined output frame period, said first image being based on a reference image stored in an image store, the reference image being represented by a plurality of pixels and each pixel having a colour represented by pixel values which define a position within colour space, said method comprising:
   determining a bounded area within colour space that contains all pixel values used within the reference image, the bounded area being smaller than colour space;
   dividing the bounded area into a plurality of defined regions;
   allocating each pixel value used within said reference image to one of said defined regions in accordance with the position in colour space of said pixel value;
   selecting one or more areas of said reference image;
   selecting, for each of said selected one or more areas, one of said defined regions;
   identifying, for each selected area of said reference image, pixels which have a pixel value which has been allocated to said selected region; and
   adding said identified pixels to said frame store to update the displayed first image;
   wherein different areas of said reference image and regions of the bounded area are selected in succession in accordance with a predetermined sequence in time until each combination of reference image area and region of the bounded area has been selected and all pixels of said reference image thereby added to said frame store for display, said predetermined sequence in time having a duration which is longer than said predetermined output frame period.

2. The method according to claim 1, further comprising:
   analysing said image to determine a distribution of pixels within colour space; and wherein dividing the bounded area into a plurality of defined regions is conducted in accordance with said determined distribution of pixels.

3. The method according to claim 2, wherein the bounded area is a smallest three-dimensional box within colour space that contains all pixel values used within the reference image and dividing the bounded area into a plurality of defined regions is conducted based on a median cut algorithm, the dividing comprising:
sorting the pixel values within the three-dimensional box along a longest axis of the three-dimensional box;
dividing the three-dimensional box into two regions at a median of the sorted pixel values; and
applying sorting and dividing to the two regions until the bounded area has been divided into a desired number of defined regions.

4. The method according to claim 1, wherein said selected areas each define a mask to be applied to said image, said method further comprising:
for each combination of one selected area of the reference image and one selected region of the bounded area, generating said mask with a peripheral area for which only a portion of said pixels falling within said peripheral area and having a colour value allocated to said selected region of the bounded area will be added to said image store for display.

5. The method according to claim 1, further comprising selecting said areas of said image and regions of the bounded area such that display of areas of said image corresponding to each region of the bounded area will gradually progress across said image, with progress of areas corresponding to different regions of the bounded are being offset by a predetermined number of output frames.

6. A display apparatus for displaying a first image from a frame store to a display device at a predetermined output frame period, said first image being based on a reference image stored in an image store, the reference image being represented by a plurality of pixels, each pixel having a colour represented by pixel values which define a position within colour space, said apparatus comprising:
a colour space processor, to determine a bounded area within colour space that contains all pixel values used within the reference image, the bounded area being smaller than colour space, and divide the bounded area into a plurality of defined regions and to allocate each pixel value used within said reference image to one of said defined regions in accordance with the position in colour space of said pixel value;
a selection processor, to select one or more areas of said reference image and to select, for each of said selected one or more areas, one of said defined regions; and
a display processor, to identify, for each selected area of said reference image, pixels which have a pixel value which has been allocated to said selected region and to add said identified pixels to said frame store to update the displayed first image;
wherein different areas of said reference image and regions of the bounded area are selected by said selection processor in succession in accordance with a predetermined sequence in time until each combination of reference image area and region of the bounded area has been selected and all pixels of said reference image thereby added to said frame store for display, said predetermined sequence in time having a duration which is longer than said predetermined output frame period.

7. The display apparatus according to claim 6, wherein said colour space processor analyzes said image to determine a distribution of pixels within colour space and divides the bounded area into a plurality of defined regions in accordance with said determined distribution of pixels.

8. The display apparatus according to claim 7, wherein the bounded area is a smallest three-dimensional box within colour space that contains all pixel values used within the reference image and said colour space processor divides the bounded area into a plurality of regions based on a median cut algorithm, the algorithm comprising:
sorting the pixel values within the three-dimensional box along a longest axis of the three-dimensional box;
dividing the three-dimensional box into two regions at a median of the sorted pixel values; and
applying sorting and dividing to the two regions until the bounded area has been divided into a desired number of regions.

9. The display apparatus according to claim 6, wherein said selected areas each define a mask to be applied to said image, and, for each combination of one selected area of the reference image and one selected region of the bounded area, said display processor generates said mask with a peripheral area which is defined such that only a portion of said pixels falling within said peripheral area and having a colour value allocated to said selected region of the bounded area, will be added to said image store for display.

10. The display apparatus according to claim 6, wherein said selection processor selects said areas of said image and regions of the bounded area such that display of areas of said image corresponding to each region of the bounded area will gradually progress across said image, with progress of areas corresponding to different regions of the bounded area being offset by a predetermined number of frames.

11. A non-transitory computer-readable medium storing computer-readable instructions which, when executed by a computer, cause said computer to carry out a method according to claim 1.

* * * * *